United States Patent Office 3,662,028
Patented May 9, 1972

3,662,028
VINYLIDENE CHLORIDE POLYMER COMPOSITIONS CONTAINING PLASTICIZED POLYVINYL CHLORIDE
William M. Wineland, deceased, late of Midland, Mich., by Elizabeth R. Wineland, executrix, Midland, Frank V. Goff, Sanford, and Fred Stevenson, Beaverton, Mich., assignors to The Dow Chemical Company, Midland, Mich.
No Drawing. Filed Mar. 2, 1970, Ser. No. 15,857
Int. Cl. C08f 29/24
U.S. Cl. 260—899
2 Claims

ABSTRACT OF THE DISCLOSURE

This invention is directed to vinylidene chloride polymer compositions and, in particular, to normally crystalline vinylidene chloride polymer compositions containing small but effective amounts of certain plasticized polyvinyl chlorides, which compositions are particularly useful for the preparation of essentially non-blocking, polymeric films having improved clarity.

BACKGROUND OF THE INVENTION

Polymers and copolymers of vinylidene chloride with such comonomers as acrylonitrile, vinyl chloride, and lower alkyl acrylates have found wide use as films for packaging of foodstuffs and other articles. One such application has been in the poultry and meat packing field. The prepared poultry or meat is generally inserted into a bag of the film, the film is evacuated and then sealed across the open end, and then the bag is heated to cause the film to shrink tightly upon the contents.

Such films possess many useful properties, such as inertness, transparency, ability to be heat-sealed and low water vapor transmission rates which are desirble for packaging foodstuffs. However, prior vinylidene chloride polymer films suffered the disadvantages of a relatively high film-to-film coefficient of friction, which often prevents the feeding of single sheets to automatic packaging equipment. Another disadvantage of normally crystalline vinylidene chloride polymer films is the tendency of these films to block. Blocking is the adherence of two or more film surfaces to each other while standing under pressure. In the manufacture of blown film, for example, this blocking phenomenon manifests itself in the adherence of the inner surfaces of the film tube to each other, making it difficult to open the tube. Still another disadvantage is a tendency of blown normally crystalline vinylidene chloride films to suffer from a lack of abrasion resistance due to poor slip properties. Prior art attempts to apply conventionally used anti-blocking and slip agents such as talc, starch, and the like to the surfaces or normally crystalline vinylidene chloride polymer films have generally been costly and inconvenient. Additionally, prior art attempts to incorporate such agents into the normally crystalline vinylidene chloride polymer prior to thermal fabrication of such polymeric composition into articles such as film have generally been unsuccessful in overcoming problems of the above-described nature and additionally produce undesirable haze in the film.

Accordingly, it is an object of this invention to provide polymeric compositions based on vinylidene chloride which are adapted to be extruded into films, tubes and the like by conventional extrusion techniques and which compositions possess markedly reduced film-to-film friction characteristics.

A further object is to provide improved polymer compositions as described above without significantly affecting other properties of films made therefrom, such as transparency, haze, vapor permeability, sealability, and the like.

Other and related objects will become apparent from the following description of the invention.

SUMMARY OF THE INVENTION

The polymeric compositions of this invention comprise in intimate blended relationship (I) a normally crystalline vinylidene chloride polymer consisting of (a) from about 70 to 95 percent by weight of vinylidene chloride and (b) from about 5 to 30 percent by weight of at least one monoethylenically unsaturated comonomer and (II) from about 0.05 to about 3 percent by weight of said normally crystalline vinylidene chloride polymer of a plasticized polyvinyl chloride composed of individual polymeric particles having a diameter of greater than 0.1 micron but less than 10 microns wherein said plasticized polyvinyl chloride has a melt viscosity in poise at 160° C. of at least about 5 times that of said normally crystalline vinylidene chloride polymer and wherein said polymeric particles melt at a temperature of about 160° C. or below.

DESCRIPTION OF THE PREFERRED EMBODIMENTS

The normally crystalline vinylidene chloride polymer that is used in the compositions of the present invention is preferably one that will produce a heat shrinkable film having at least about 30 percent shrinkage in boiling water, and advantageously one that will produce a film having a shrinkage between about 45 and 55 percent shrinkage in boiling water. Beneficially, the vinylidene chloride polymer should be plasticized to the extent necessary to produce a polymeric material having a melt viscosity of about 30,000 poise at 160° C.

Typical of the polymeric materials falling within the definition are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and others, butadiene and chloropropene. known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known.

The plasticized polyvinyl chlorides which are useful for the purposes of this invention are those materials composed of individual polymer particles having a diameter greater than 0.1 micron but less than 10 microns with those materials having a diameter of from about 1 to 2 microns being preferred. In this regard, polymer particles having a diameter of 0.1 micron or less are too fine to provide adequate non-blocking or "slip" properties whereas particles having a diameter of 10 microns or above provide film materials having an overly rough or grainy surface. Further, such polyvinyl chlorides must be sufficiently plasticized to prevent the presence of unplasticized polymer particles in the extrudate of the polymer blends contemplated by the present invention. In this regard, a wide variety of polyvinyl chloride plasticizing materials may be used, exemplary of which are dibutyl sebacate, dioctyl phthalate, dibutyl phthalate, dioctyl azelate and many others known in the art. These materials are generally used in amounts ranging from about 30 to 70 percent by weight of the polyvinyl chloride. In any case, the plasticized polyvinyl chlorides of the present invention must be characterized by having a melt viscosity in poise at 160° C. which is at least about 5 times that of the vinylidene chloride polymer constituent to prevent flow of the plasticized polyvinyl chloride particles thereby providing adequate film slip and resistance to blocking. Additionally, the polymeric particles of such plasticized polyvinyl chlorides must melt at a temperature of about 160° C. or less and provide a continuous phase with the melted normally crystalline vinylidene chloride polymer thereby forming film materials of desired clarity, i.e., without the formation of excessive internal haze.

The plasticized polyvinyl chlorides described herein must be present in amounts of at least about 0.05 percent by weight to provide the necessary slip properties. Preferred amounts range from greater than about 0.1 to about 0.4 percent by weight for obtainment of optimum slip properties and film clarity. Amounts greater than about 0.4 up to about 3 percent by weight are useful where film clarity is not critical to provide film materials having excellent slip while maintaining desirably uniform, i.e., non-grainy film surfaces.

When preparing the polymeric compositions of the invention, it is important that a thorough and complete intimate mixing of the plasticized polyvinyl chloride and the normally crystalline vinylidene chloride polymer is effected. This is best accomplished by blending the two materials while they are in a solid, powdered or pulverulent form. However, any means suited for the purpose may be employed such as mixing the materials in molten form. This is usually less desirable, though, because of the thermal degradation of the polymers when maintained at melting temperatures.

Films and related shaped articles can be fabricated from the compositions of the invention by any of the conventionally employed fabricating or extruding techniques. Of particular advantage, is to employ the bubble technique for making films in tubular form.

Films prepared from the present compositions can be used in either oriented or unoriented condition. Thus, unoriented films are especially well suited for preparing laminate structures. The unoriented films provide excellent extensibility to the laminate structure as well as providing desirable permeability.

The compositions of the present invention are useful in other processes, such as molding, slot extrusion, and other thermal fabrication techniques, to form films, fibers, foils, molded articles, and other forms having the superior properties; and may also contain conventionally used additives and stabilizers, e.g., antioxidants and light stabilizers which do not deleteriously affect the properties of the film materials.

The invention will be illustrated with the following example in which all percentages and parts are by weight.

Example I

A crystalline copolymer composed of 73 percent by weight vinylidene chloride and 27 percent by weight of vinyl chloride was prepared by emulsion polymerization, utilizing potassium persulfate as the catalyst and the dihexyl ester of the sodium salt of sulfosuccinic acid as the emulsifier in a manner well known in the art. To the so-formed dried crystalline polymer was dry-blended 0.25 percent by weight of stearamide, and 9 percent by weight of dibutyl sebacate, a plasticizer. This plasticized copolymer had a melt viscosity of about 30,000 poise at 160° C.

Separate portions of the crystalline polymer as described herein, were individually dry-blended with varying amounts based on the weight of normally crystalline vinylidene chloride polymer of a polyvinyl chloride having individual particles of a diameter of from 1 to 2 microns and containing about 40 parts per hundred of the plasticizer dioctyl phthalate. This material had a melt viscosity of about 250,000 poise at 160° C. The mixtures were subsequently individually thermally extruded at a temperature of about 160° C., using standard bubble techniques, into oriented film having a nominal width of about 8 inches and a nominal thickness of about 125 gauge. Each of the so-formed film samples were then individually rated for percent haze by the procedures of ASTM Test No. D-1882-63 and film-to-film coefficient of friction utilizing the procedures of ASTM Test No. D-1894-63. The uniformity of the haze in each film sample was also visually determined. Non-uniformity or a "grainy" appearance results from non-uniform distribution of the slip additive in the polymer blend.

The results of such testing is set forth on the following Table I.

TABLE I.—ORIENTED 125 GAUGE FILM

| Sample No. | Plasticized PVC, percent | Coefficient of friction | Film appearance | |
|---|---|---|---|---|
| | | | Percent haze | Haze distribution |
| 1 | None | >13 | 2.4 | Uniform. |
| 2 | 0.1 | .5 | 5.5 | Do. |
| 3 | 0.3 | .2 | 9.8 | Do. |
| 4¹ | 0.4 | .2 | 8.2 | Do. |
| 5 | 0.5 | .2 | 15.7 | Do. |
| 6 | 0.7 | .2 | 20.7 | Do. |
| 7 | 0.9 | .2 | 24.8 | Do. |
| 8 | 1.0 | .2 | 27.9 | Do. |
| 9 | 2.0 | .2 | 41 | Do. |
| 10 | 3.0 | .2 | >41 | Do. |

¹ Polyvinyl chloride having 70 parts per hundred of plasticizer dioctyl phthalate and a melt viscosity of about 250,000 poise at 160° C.

By way of comparison, a series of film materials was prepared as described herein but wherein varying amounts of calcium carbonate, having a particle size of about 2 microns, was used instead of the plasticized polyvinyl chloride. The following Table II set forth the amounts of calcium carbonate used and the appearance of the film materials obtained.

TABLE II

| Sample No. | CaCO₃, percent by wt. | Coefficient of friction | Film appearance | |
|---|---|---|---|---|
| | | | Percent haze | Haze distribution |
| 11 | 0.10 | .3 | 6.5 | Grainy. |
| 12 | 0.15 | .3 | 8.7 | Do. |
| 13 | 0.25 | .3 | 9.9 | Do. |
| 14 | 1.0 | .2 | 32.9 | Do. |

It is to be noted that the compositions of the present invention make unnecessary the expense and inconvenience of external dusting of the blown oriented polymer film and the preferred compositions of this invention produce polymeric films of equivalent slip and clarity as compared externally dusted films. To illustrate such comparison, oriented polymeric film samples were prepared as described herein wherein the plasticized polyvinyl chloride was eliminated and wherein the oriented film was externally dusted with conventionally used starch dust. Such film was characterized by having a percent haze of 9.0 and a coefficient of friction of .2.

What is claimed is:
1. An oriented substantially non-blocking film having a uniform haze distribution comprising essentially a blend of (I) a normally crystalline vinylidene chloride polymer consisting of (a) from about 70 to 95 percent by weight of vinylidene chloride and (b) from about 5 to 30 percent by weight of at least one monoethylenically unsaturated comonomer and (II) from about 0.05 to 3 percent by weight of said normally crystalline vinylidene chloride polymer of a plasticized polyvinyl chloride composed of individual polymeric particles having a diameter greater than 0.1 micron but less than 10 microns wherein said plasticized polyvinyl chloride has a melt viscosity in poise at 160° C. of at least about 5 times that of said normally crystalline vinylidene chloride polymer and wherein said polymeric particles melt at a temperature of about 160° C. or below.

2. In the process of preparing oriented essentially non-blocking normally crystalline vinylidene chloride polymer films the improvement consisting of (1) preparing an intimate blend of (I) a normally crystalline vinylidene chloride polymer consisting of (a) from about 70 to 95 percent by weight of vinylidene chloride and (b) from about 5 to 30 percent by weight of at least one monoethylenically unsaturated comonomer and (II) from about 0.05 to 3 percent by weight of said normally crystalline vinylidene chloride polymer of a plasticized polyvinyl chloride composed of individual polymeric particles having a diameter of greater than 0.1 micron but less than 10 microns wherein said plasticized polyvinyl chloride has a melt viscosity in poise at 160° C. of at least about 5 times that of said normally crystalline vinylidene chloride polymer and wherein said polymeric particles melt at a temperature of about 160° C. or below, then (2) fabricating said blend into an oriented film structure.

References Cited

UNITED STATES PATENTS

| | | | |
|---|---|---|---|
| 2,943,000 | 6/1960 | Austin | 117—72 |
| 3,014,004 | 12/1961 | Meier | 260—29.6 |
| 3,275,716 | 9/1966 | Wiggins | 260—899 |

FOREIGN PATENTS

| | | | |
|---|---|---|---|
| 694,516 | 9/1964 | Canada | 260—899 |

MURRAY TILLMAN, Primary Examiner

J. SEIBERT, Assistant Examiner

U.S. Cl. X.R.

260—31.8 M, 890, 898